United States Patent [19]

Ward

[11] Patent Number: 5,317,818
[45] Date of Patent: Jun. 7, 1994

[54] POUCH CHILLER
[75] Inventor: Bryant C. Ward, Salinas, Calif.
[73] Assignee: Garroutte, Inc., Watsonville, Calif.
[21] Appl. No.: 992,148
[22] Filed: Dec. 17, 1992
[51] Int. Cl.⁵ .............................................. F26B 19/00
[52] U.S. Cl. ...................................... 34/207; 62/374;
198/372; 198/457
[58] Field of Search ............... 414/759, 760, 774, 152,
414/173, 172, 177; 34/203, 207, 216, 217;
198/372, 457, DIG. 952, 407; 62/74, 374, 375

[56] References Cited
U.S. PATENT DOCUMENTS 4,718,534  1/1988  Harper ............................. 198/409 X
5,165,516  11/1992  Reed et al. .......................... 198/372

Primary Examiner—Henry A. Bennett
Attorney, Agent, or Firm—Robert Charles Hill

[57] ABSTRACT

A conveying system for food processing such as cooling pouches of food discharged in a single line from a pouch filler including apparatus for rearranging the pouches in order to shorten the line. One apparatus is a right angle transfer device in which the pouches are discharged in a single line onto a belt array which is then dropped to allow an array of rollers to support the pouch and transfer its direction of motion. Another apparatus includes an array of rollers which move the pouch into a position forming a row of pouches which is then picked up by rollers and moved in a direction as a line of rows of pouches. Another apparatus is a belt system for supporting the row of pouches as it is being transferred from a downstream end of an upper conveyor to an upstream end of a lower conveyor thereby reversing the direction of motion of the pouches and allowing them to pass back through the treatment chamber. Mechanistic principles of the invention can be applied to various other operations in addition to hydrochilling such as heating, spraying, etc.

14 Claims, 7 Drawing Sheets

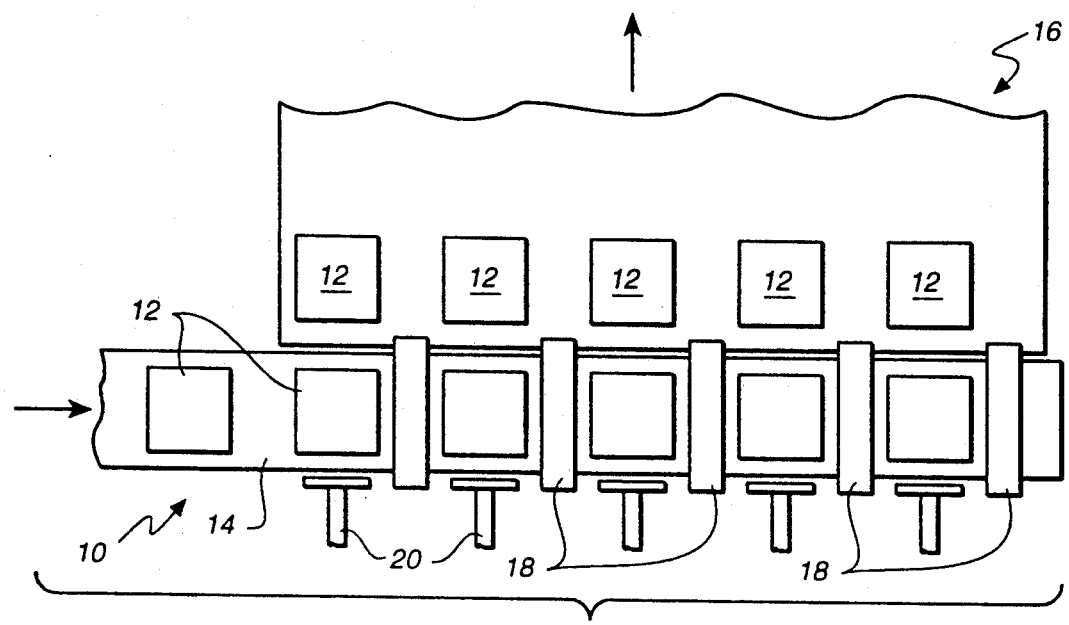
FIG._1
(PRIOR ART)
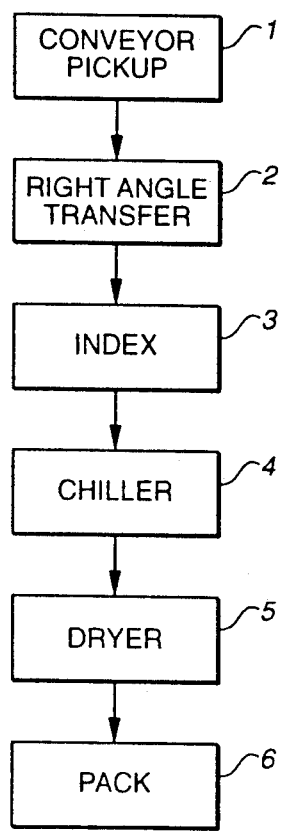
FIG._3

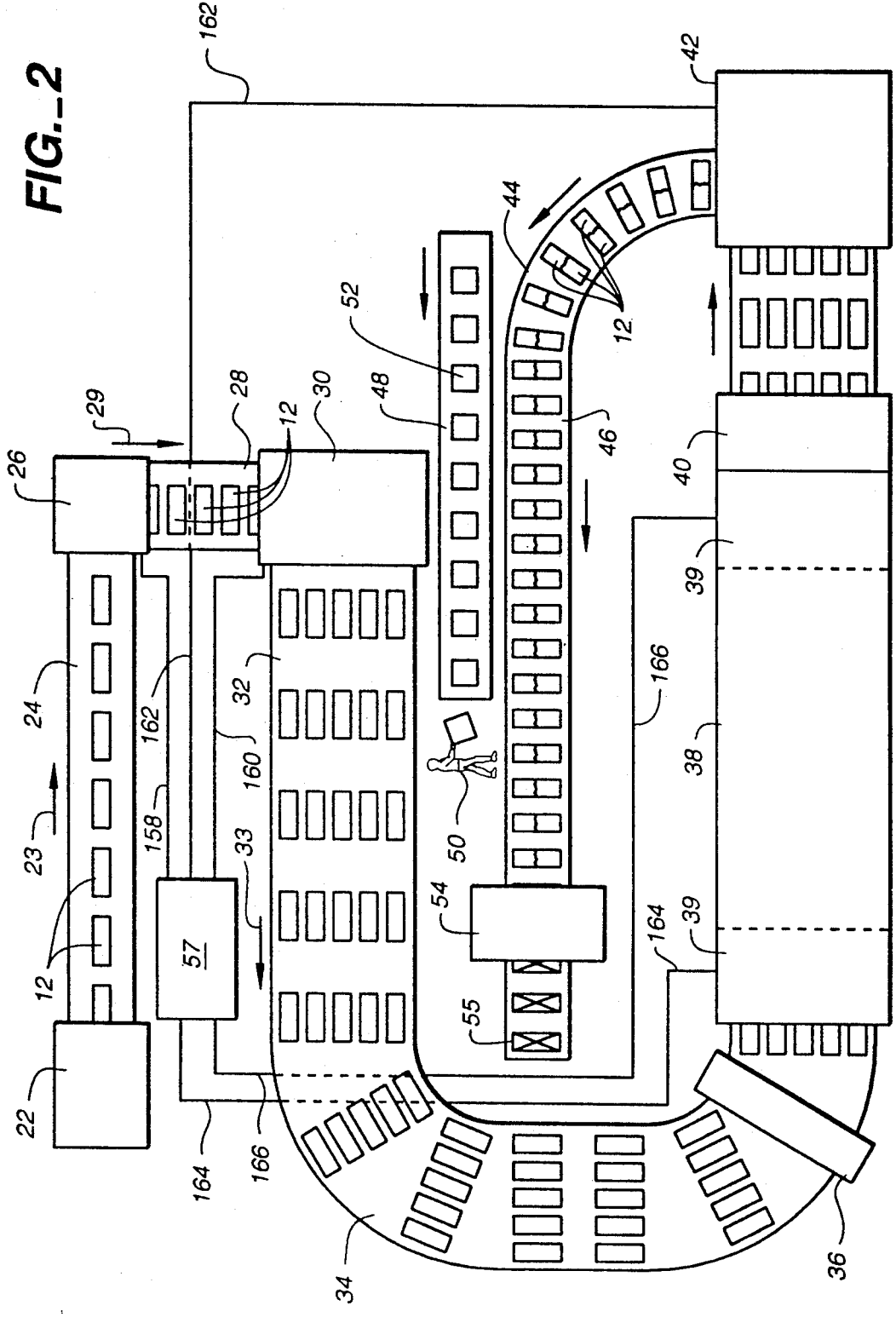

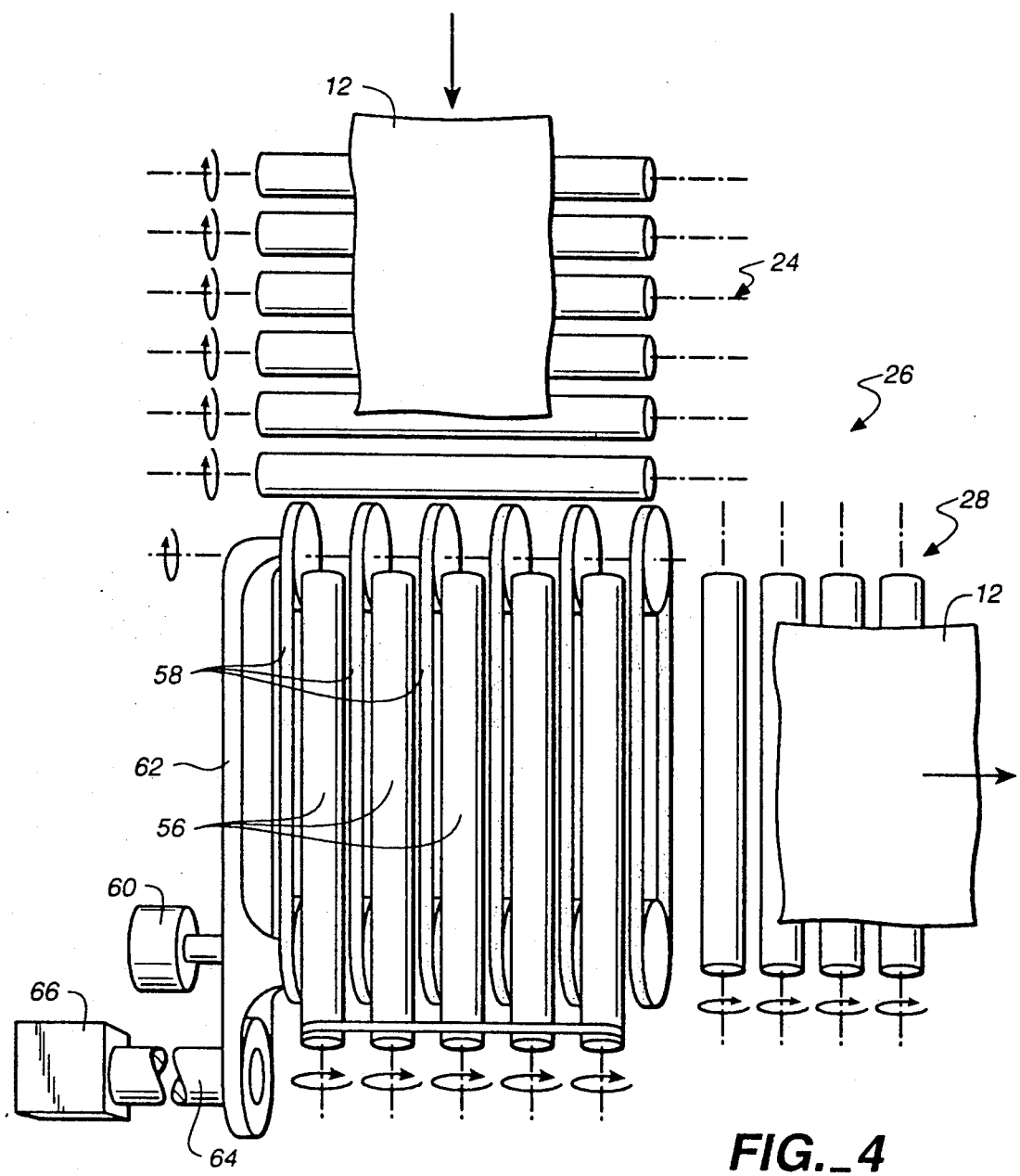
FIG._4

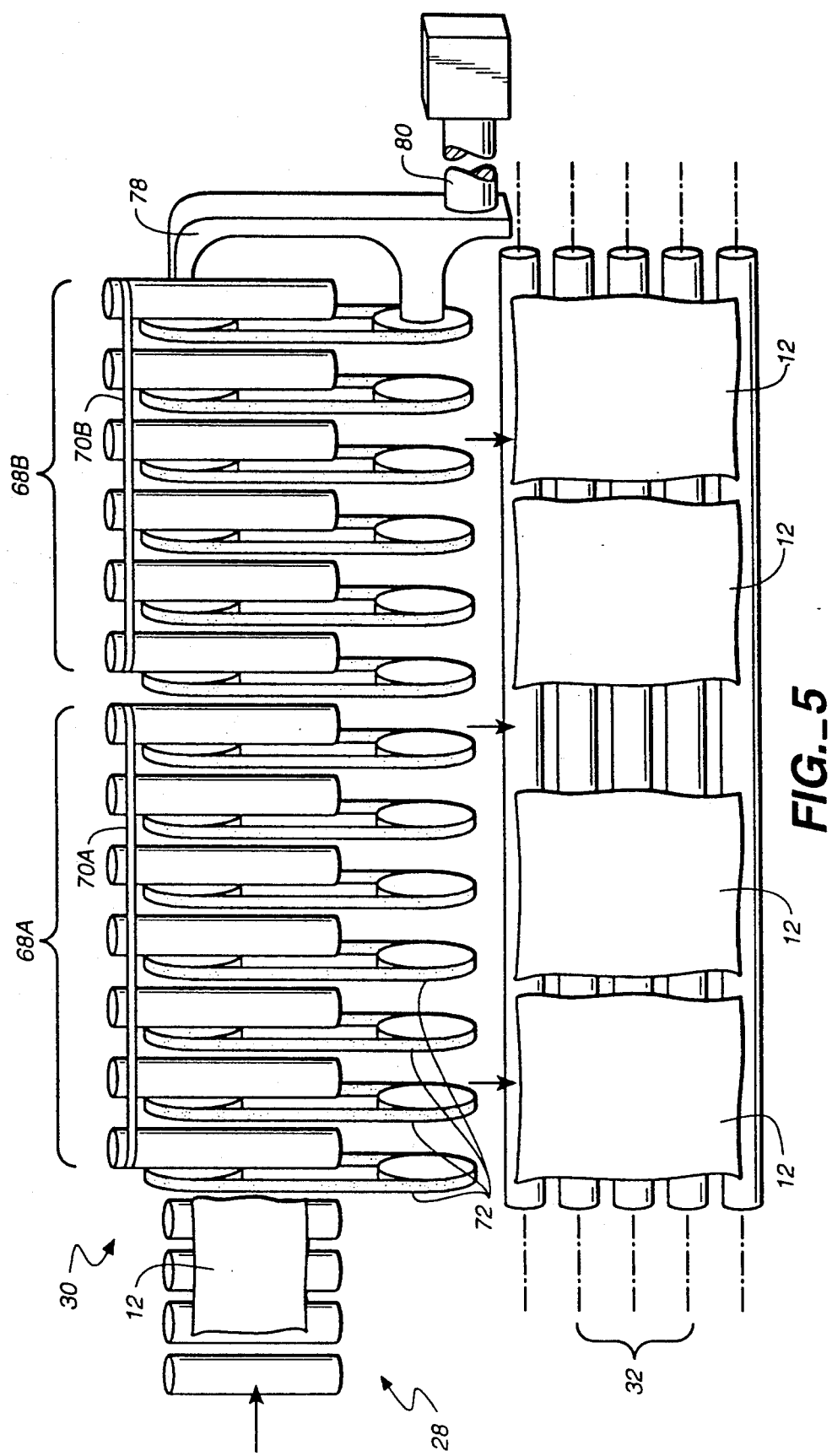

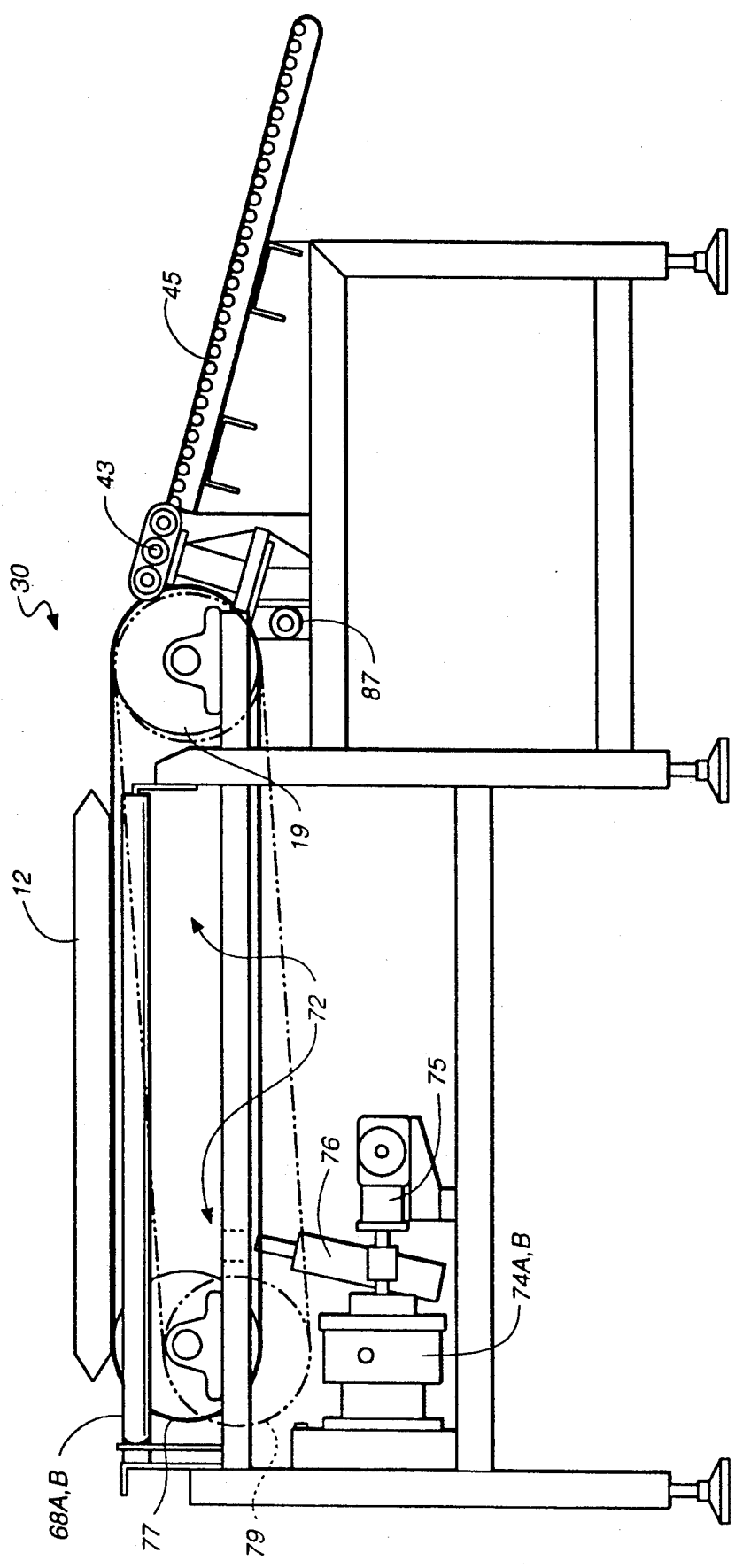
FIG._6

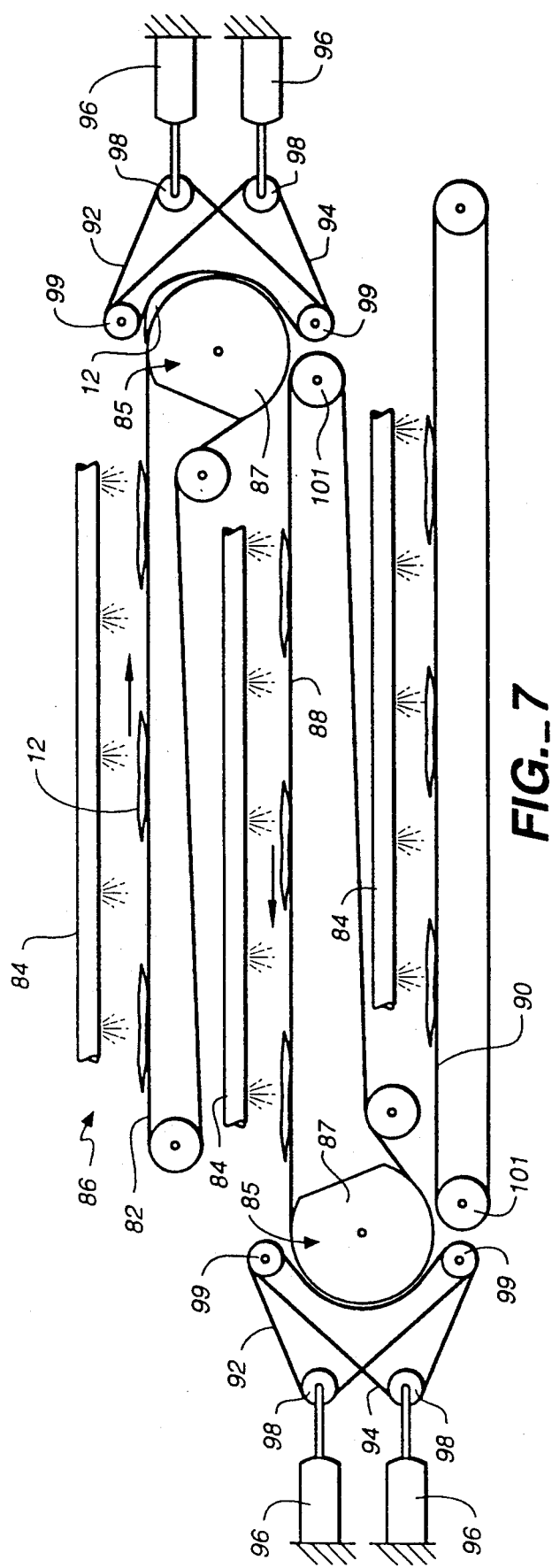
FIG._7

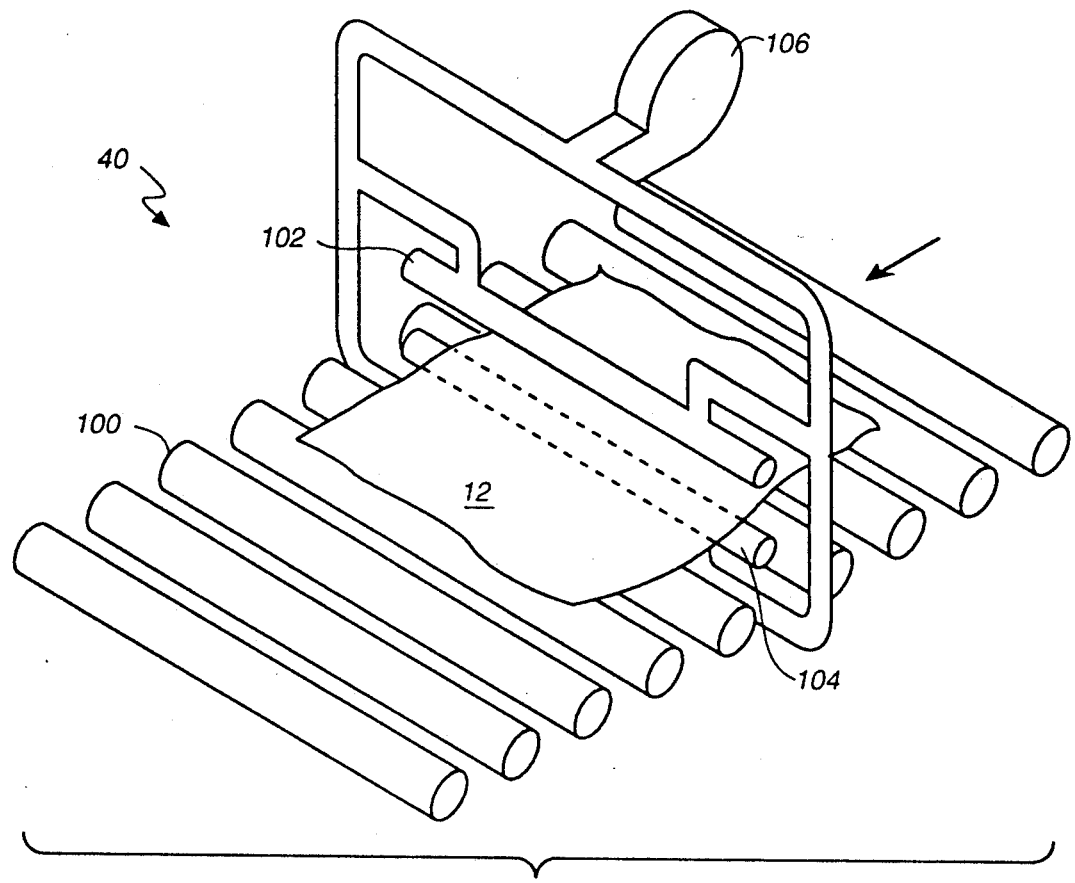
FIG._8
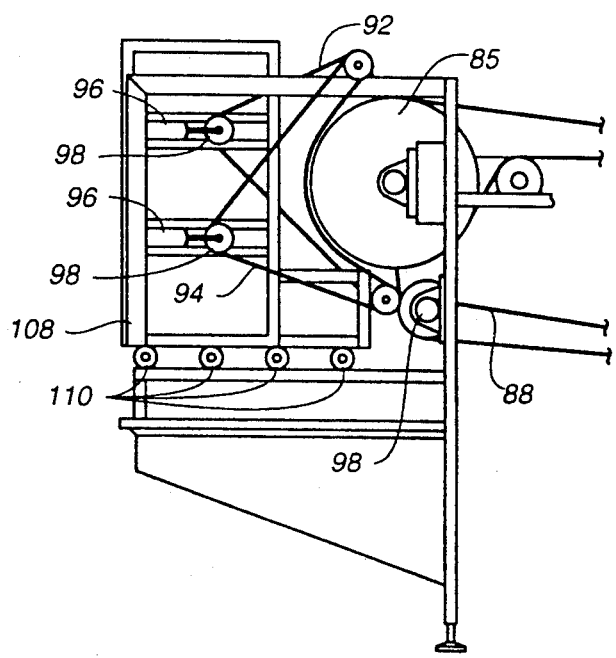
FIG._9

POUCH CHILLER

BACKGROUND

1. Field of the Invention

This invention relates to systems for chilling pouches of food and particularly to a chilling system having a conveying apparatus that automatically conveys pouches of food through a chilling step. In the context of this specification, a conveying apparatus will be understood to mean an apparatus such as a continuous belt or length of parallel rotating rollers that transports a plurality of items from an upstream (entrance) end to a downstream (exit) end in a continuous line (one after the other).

2. Prior Art and Information Disclosure Statement

In many instances, the food industry has adopted the use of plastic pouches or bags as a replacement for rigid containers such as barrels or metal drums formerly used to pack and ship a wide variety of foods. Foods that are presently packed and shipped in pouches include tomato products, various toppings such as chocolate and strawberry, soups, ets. The primary reason for the popularity of pouches for this purpose is cost, not only in terms of the cost of the container, but also in terms of the versatility provided in building equipment to handle these containers.

Typically, the temperature of the pouches of food discharged from a filler is 190°-200° F. The temperature of the pouches must be reduced to 105°-110° F. in order that the pouch can be handled and stored to ambient temperature without deterioration of the product. This reduction in temperature should take place in about 20 to 45 minutes.

The pouches are generally discharged from the filler one pouch at a time. If the pouches must pass through the chiller in a single line, then the length of the line would be excessively long. Therefore, the industry has adapted conveying apparatus that forms rows of pouches that progress through the chiller.

FIG. 1 is a top view showing the indexer 10 of a conveying apparatus of the prior are having a single line of product 12 on a continous belt 14 coming from the filler and moving in the direction from left to right as shown by the arrow. The index station comprises a line of retractable gates 18, each gate 18 coupled to a pneumatic cylinder (not shown), such that, as each pouch 12 carried by the belt 14 reaches its position in the indexer, the respective gate 18 comes down to prevent further movement of the pouch. When all the gates 18 are down, as detected by an electric eye, a set of pushers 20 move the pouches 12 onto a transfer belt in rows 16, with five pouches to a row, that carry the rows of pouches through the chiller.

The rows of pouches pass through the chiller three times by moving on a top level, an intermediate level, and a lower level in succession. This three pass construction requires a shorter chilling machine and also conserves the amount of cooling water needed. The pouches are transferred from one level to the next lower level by an array of rollers which guide the pouches but more or less allow the pouches to "free fall" from one level to the next lower level.

Damage to the pouches during their trip through the chiller system of the prior art occurred because of a number of reasons discussed below. The problem has been exacerbated by the introduction of thinner flexible plastic pouches.

One source of damage to the pouch was that the belt continued to run after the pouch had been stopped by the gate in the indexer thereby subjecting the pouch to rubbing from the belt as well as pushing a portion of the pouch under the nearest gate.

Another source of damage to the pouches is the rough treatment from the guide rollers as the pouch free falls to the next lower level in the chiller.

Another problem is that the retracting gate is sometimes jammed by an incoming pouch. Pouches of plastic can be jammed under the gate of the prior art indexer because the plastic is comparatively thin and flexible.

Another problem is that the conveying system is designed to receive only a fixed number of pouches in a row determined by the number of gates across the conveyor belt. This characteristic places a limit on the rate of throughput of pouches regardless of the size of the pouches.

SUMMARY

It is therefore an object of this invention to provide a conveyor system that can handle a number of pouches across the width of a conveyor belt wherein that number depends on the size of the pouch so that the conveyor belt is always full. The apparatus includes sensors and a computer system which arranges the number of pouches in a row across the belt. The indexing system includes an array of rollers which transform a single line of pouches into a row of pouches. The rollers are programmed in sections such that each section stops when the respective pouch has been rolled into its place in the row thereby avoiding the continuous rubbing of the pouch as experienced with the indexers of the prior art. The rollers avoid the necessity of gates so that no jamming can occur as discussed above. When a row is full, an arrangement of belts rises to lift the pouches off the rollers and transfer the entire row to a conveyor that transfers the rows of pouches to the entrance of the chiller.

It is another object that the pouches make one pass in one direction through the chilling area and then are transferred to a lower conveyor to make a pass back through the chilling region without being subject to possible damage as otherwise experienced with transfer devices of the prior art. A feature of this invention is a belt on a cylindrical slider bed and a pair of endless belts located at the downstream end of each conveyor section. The pouch becomes sandwiched between the endless belts and is thereby carried from the upper conveyor to the lower conveyor for the reverse trip through the chilling region. The force of the belts toward the each other is controlled by a pneumatic ram to prevent damage to the pouches.

Another feature of this invention is the computer control that increases the versatility of the apparatus in terms of adapting to various size pouches to increase throughput. Yet another feature is a failure detection scheme with shut down capability to avoid compounding problems such as might be initiated by jams, spills, etc.

BRIEF DESCRIPTION OF THE DRAWINGS

FIG. 1 shows an indexer of the prior art.

FIG. 2 shows the general layout of the hydrochiller of this invention.

FIG. 3 lists the steps in the hydrochilling process of this invention.

FIG. 4 illustrates a top view the right angle transfer of this invention.

FIG. 5 illustrates the indexer of this invention.

FIG. 6 is an elevation view of the indexer.

FIG. 7 shows the three level hydrochiller and the reverse transfer mechanisms.

FIG. 8 shows the the dryer.

FIG. 9 shows the modularized reverse transfer mechanism.

DESCRIPTION OF THE PREFERRED EMBODIMENT

Referring to the drawings and particularly to FIGS. 2 and 3, a pouch filler 22 (not a part of this invention) discharges filled pouches onto an entry conveyor 24. The pouches are arranged with the length parallel to the direction of travel as shown by arrow 23.

A right angle transfer 26 receives pouches, one large pouch (24 inches wide) at a time, or one set of two small pouches (12 inches wide) at a time, from the entry conveyor 24 and discharges the pouches, one pouch or one set of pouches at a time, onto a feed conveyor 28 with the width dimension parallel to the direction of travel as shown by arrow 29.

The feed conveyor 28 delivers the pouches to an indexer 30 which forms rows of pouches and delivers one row at a time to a transfer conveyor 32 such that each pouch has its width oriented parallel to its row and its length moving in the direction of the motion of the transfer conveyor as shown by arrow 33.

The entry and feed conveyors 24 and 28 are typically 30 inches wide while the transfer conveyor 32 is typically 60 inches wide and can accommodate up to ten pouches in a row distributed across its width.

The incline transfer conveyor 32 then delivers the rows of pouches to a "180 degree" conveyor 34, which conveyor 34 may be eliminated in some situations depending on the size of the building.

The "180 degree" conveyor 34 discharges the row of pouches to a first cooling sprayer 36 before the pouches enter the waterfall chiller 38. The rows of pouches make three passes through the waterfall chiller using an elevator reverse transfer system that transfers the rows of pouches from an upper level conveyor to an intermediate level conveyor moving in a direction opposite the upper conveyor, and then to a lower level conveyor moving in the original direction. A reverse transfer apparatus 39 is provided at each end of the chiller 38 to perform this operation.

The waterfall chiller 38 delivers the rows of pouches to a pneumatic drier 40 which blow dries the pouches. The pneumatic drier 40 discharges the pouches to a "right angle" transfer unit 42 which discharges the pouches, one row at a time, onto a collection conveyor 44 which may be curved to change direction of motion by 90 degrees in order to shorten the overall length of the apparatus. The pouches are now arranged in a single line for discharge to a "case-off" conveyor 46 which meets a "formed carton" conveyor 48 where an operator 50 manually packs pouches received from the "case-off" conveyor 46 into cartons 52 received from the "formed carton" conveyor 48. The filled cartons are then placed back onto the "case-off" conveyor 46 which transports them to the carton sealing station 54. The sealing station 54 discharges the sealed cartons 55 which are ready for shipment. FIG. 2 also shows a central computer 57 which controls the operation and receives alarm signals on lines 158, 160, 162, 164 and 166 to shut down the system when required.

Referring now to the remaining drawings which present details of the components shown in FIG. 2 which are features of this invention, FIG. 4 illustrates a top view of the right angle transfer mechanism 26 which includes a plurality of parallel rollers 56 and a V-belt array wherein each V belt 58 is positioned between neighboring rollers 56. All of the belts 58 have a common drive 60. Drive 60 and the array of belts 58 are supported on an arm 62 which can pivot about axis 64 under the control of a cylinder (not shown in FIG. 4). The uppermost level of the belts 58 is initially above the level of the rollers 56 so that the belts 58 can pick up pouches 12 arriving from the entry conveyor 24. In the context of this specification, the "belt plane" is taken to mean the uppermost plane of the plurality of belts on which the pouch rests. When pouch 12 is positioned on the belts 58, an electric eye (not shown in FIG. 4) energizes the linear actuator 76 to drop the belt array 58 below the rotating rollers 56 so that the pouches come to rest on the rollers 56. In the context of this specification, the "roller plane" is taken to mean the plane tangent to the rollers on which a pouch may rest. Rollers 56 transfer the pouch 12 to the feed conveyor 28 which is moving in a direction perpendicular to the entry conveyor 24 and delivers the pouch 12 to the indexer 30.

FIG. 5 illustrates the principles of operation of the indexer 30. A row of rollers is shown divided into sections 68A and B. Each section is driven by its own belt, 70A or B so that each section operates independently of the other. To form a row of pouches, each pouch is rolled across the rollers 68A and B on the roller plane in succession from the feed conveyor 28. An electric eye (not shown) detects when the roller plane of each section 68A and B of rollers becomes filled with pouches and signals the computer to stop the supporting section of rollers so as to avoid rubbing the pouch while forming a complete row of pouches.

FIG. 6 is a side view of indexer 30 showing pouches 12 resting on roller sections 68A and B. Each roller section 68A and B has an air operated clutch brake assembly 74A and B respectively, allowing each roller drive section to be individually engaged or disengaged from driver 75. A driven roller transfer 43 to gravity feed roller section 45 facilitates transfer to transfer conveyor 32. Belt pulley 19 is a machined U. H. M. W. (ultra high molecular weight) polyethylene pulley. When the row has been completely formed, an electric eye detects this condition and the computer energizes three cylinders 76 (one is shown) to rotate the set of belts 72 (one belt between a neighboring pair of rollers) about a pivot axis 80 so that the belts 72 lift the pouches 12 off the rollers 68 and carry the row of pouches out of the indexer 30 and discharge the row onto the transfer conveyor 32. FIG. 6 shows the belts 72 in the up position 77 and the down position 79 for performing the transfer operation. The belt array 72 is shifted from the down to the up position by three cylinders 76 having a base end attached to the main frame and operating in unison under the control of a single solenoid valve (not shown). Only one cylinder is shown in FIG. 6 since the two other cylinders are behind the cylinder 76.

An electric eye (not shown) detects when the row is full and activates the valve causing the cylinders to raise the belts by rotating them about pivot axis 64. The belts run continuously.

The pneumatic cylinders 76 are activated for a period that is controlled by a timer in the computer. The activation time of the cylinder is programmed according to the width of the pouch and speed of the rollers. At the end of the timed period, the cylinder is deactivated allowing the belt array to return to its original position to await the next pouch.

What the indexer has accomplished is to transform a single line of pouches entering the indexer into a line of rows of pouches thereby shortening the line that must pass through the chiller.

It may be understood that the construction and operation of the right angle transfer 26 is very similar to the construction and operation of the indexer 30.

The transfer conveyor 32 is inclined to receive pouches from the indexer at a lower level 26 and lift them up to the level of the "180 degree" conveyor 34 (FIG. 1) which is located at the same level as the top level of the hydrochiller 38. The function of the "180 degree" conveyor 34 is simply to change the direction of the conveying line in order to accommodate the shape of the building. the "180 degree" section may be eliminated in some situations.

Ambient water is cascaded over the pouches to start the cooling process before the pouches enter the hydrochiller. The water is then pumped back to the cooling tower to be reused again.

FIG. 7 illustrates in elevation the chilling apparatus. Pouches 12, carried by endless belt 82 supported on cylindrical support members 85 are cooled with ambient water 84 in the first pass on the top conveyor that moves the row of pouches from the entrance 86 to the opposite end of the top conveyor 82. Then the pouches are transferred to the intermediate level endless belt 88 for a return pass under chilled water. Finally, the pouches are transferred to the lower level endless belt 90 for the third pass under chilled water.

The pouches are safely carried from one level to the lower level by a reverse transfer mechanism that is a feature of this invention. As shown in FIG. 7, the pouches are sandwiched between belts 82 and either 92 or 94 located at the downstream end of and perpendicular to conveyor belts 82 or 88 respectively and at least one continuous reverse transfer belt (belts 92 and 94 are shown around idler pulleys 99 and transfer belt pulleys 98 in FIG. 7). The transfer belts 92 and 94 press the pouch 12 against the respective belts 82 and 88 with a force that is adjustable by means of air cylinder 96 forcing idler belt pulley 98. This construction provides that the pouches will be controllably carried between the belts and descend at a controlled speed rather than being allowed to free fall between guiding rollers as practiced with apparatus of the prior art, thereby avoiding damage to the pouch. In the context of this specification, the term "carried" is understood to mean that the item being conveyed is neither rubbed by the conveying apparatus nor dropped as is the case with the apparatus of the prior art but is carried in a manner described in the foregoing sentence.

In a variation of this embodiment, FIG. 9 shows the transfer belts and supporting mechanism mounted on a frame 108. The transfer belts and supporting mechanism are supported on a frame 108 mounted on bearings 110 providing that the transfer assembly can be manually moved away from the end of the belts 82 and 88 in the event of a jam or for clean up.

FIG. 8 illustrates the drier at the exit of the hydrochiller comprising the conveyor 100, top air knife 102 and bottom air knife 104 to blow water off the cooled pouches. Blower 106 provides the air required for both air knives.

At the exit to the pouch dryer, an electric eye will detect the presence of the pouch. The computer will continuously monitor the input from this electric eye. When the computer detects the presence of a pouch, it will emit a signal that energizes a solenoid valve to stop the "90 degree" conveyor. As soon as the "90 degree" conveyor is stopped, a timer (adjustable according to the size of the pouch) will begin a timing period. At the end of the period a signal will be emitted that energizes a solenoid valve to an air cylinder thereby retracting the roller section. An output to the "90 degree conveyor control solenoid will be de-energized and the roller section will reposition over the conveyor. The cycle will then be ready to repeat for the next row of pouches.

As described above, the 90 degree conveyor carries pouches from the pouch dryer to the case-off conveyor. The 90 degree conveyor will be started and stopped to meet cartons on the formed carton conveyor where an operator packs the cartons and sends them on to the sealer.

FIG. 2 shows the general layout of the system with a number of electric eyes located throughout to detect problems with the progress of the pouches through the chiller. The electric eyes are all connected by lines 156–166 to the central computer 57. A signal from the electric eye to the computer de-energizes a solenoid which activates the hydraulic control unit. This shuts down the hydrochiller drive motors and all other hydraulic drive motors upstream of the chiller that operate the conveyors. Equipment downstream from the chiller will continue to operate. A visual alarm at the control panel will indicate the location of the fault.

Electronic eyes are positioned below the rollers of the indexer which detect any pouch pulled out of the proper transfer position. If a pouch is detected out of position, a signal on line 160 is sent to the computer 57.

Similar to the indexer, an electronic eye is placed at the right angle transfer 26 and sends a signal over line 158 to the computer 57 if a pouch is misaligned.

An electronic eye is also positioned at each of the reverse transfers on the hydrochiller and are connected to the computer 57 by lines 164 and 166. The sensors will detect the pouches being conveyed from one level of the chiller to the level below. The computer 57 will monitor the input signals from these sensors to detect any abnormally long presence of a pouch. When a pouch is detected, an adjustable timer in the computer 57 will begin its period. If the pouch is present longer than a preset time, the computer logic will signal that a backup condition may exist.

After the fault has been cleared, the operator must press a manual reset button at the control panel to restart the equipment. The manual reset will cause the computer to re-energize the solenoid valve on the hydraulic power supply and to reset the visual alarm on the control panel.

A safety cable is also located with a manually operated switch at the case-off conveyor. When this switch is closed, a signal is sent by the computer that interrupts power to the entire hydraulic system thus stopping the entire line. A reset at the control panel is required to restart the system.

Modifications and variations to the apparatus described above may be contemplated which are within the scope of the invention.

For example, the principles of the invention may be incorporated into apparatus that process items other than pouches.

The mechanistic principles of the right angle transfer and indexer may be used in the processing of boxes.

The operation may be one of a number of treatments other than hydrochilling. For example, the operation may be a washing operation, drying operation or baking operation.

The mechanistic principles of the reverse transfer involves a belt pressing against the pouch to carry the pouch to a lower level rather than simply letting the pouch free fall. The embodiment described above included a pouch sandwiched between a drum and at least one belt. An alternative embodiment would be a pouch sandwiched between two sets of belts. This reverse transfer mechanism could be used as an elevator to raise items (rather than lower items as shown in the drawings and could enable substitution of the long inclined transver conveyor 32 by a much shorter horizontal transfer conveyor and elimination of the "180 degree" conveyor 34. This would considerably reduce size and cost of the overall system.

A two pass chiller (two levels) may be designed which features the novel reverse transfer mechanism described above.

Position switches may be used in place of electric eyes to detect the presence or misalignment of the pouches.

I therefore wish to define the scope of my invention by the appended claims.

I claim:

1. An apparatus for conveying items, said items having a length and a width, said items conveyed to said apparatus in a single line traveling in a conveyor direction, each said item oriented such that said length is parallel to said conveyor direction, said apparatus comprising:
   a pulley base, rotateably mounted on a pivot axis;
   two pulley axles, rotateably mounted on said pulley base, oriented side by side and parallel to one another;
   a plurality of pairs of pulleys, one pulley of each pair of pulleys mounted on one said axle aligned with said other pulley mounted on said other axle;
   a plurality of endless belts, each one said belt mounted on one said pair of pulleys respectively, providing that each said belt is side by side, parallel to and separated from its neighboring belts by a space;
   each of said plurality of belts having an uppermost belt section defining a belt plane on which said at least one of said items may rest;
   means for rotating said pulleys simultaneously such that said belt plane moves in a belt direction;
   a plurality of rollers, each said roller occupying one of said spaces respectively, all said rollers arranged side by side parallel to one another and said belt section thereby defining a roller direction;
   means for rotating said plurality of rollers such as to define a roller direction perpendicular to said belt direction;
   means for rotating said pulley base between an upper and lower orientation on said pivot axis such that said belt plane be above or below said roller plane respectively, providing that, when said belt direction is aligned with said conveyor direction and said pulley base is in said upper orientation, said item will be moved onto said belt plane and, when said pulley base is then moved to said lower orientation, said item will be supported by said roller plane and be conveyed in said roller direction perpendicular to said belt direction and said conveyor direction and with said width oriented parallel to said roller direction and, further providing that, when said belt plane is below said roller plane and said roller direction is oriented parallel to said conveyor direction, said items will be moved onto said roller plane, then when said pulley base is oriented to said upper position, said item will be supported by said belt plane and be conveyed in said belt direction perpendicular to said conveyor direction with said width oriented in said belt direction.

2. An apparatus as in claim 1 wherein said items are presented to said apparatus at an entrance roller and said plurality of rollers comprises at least two sections of said rollers; and said means for rotating said rollers comprises a separate means for rotating each one of said roller sections respectively.

3. An apparatus as in claim 2 wherein said apparatus comprises:
   means for detecting presence of a least one of said items on a roller plane of one said roller sections respectively and emitting a signal when said section supports a quantity of said at least one of said items.

4. An apparatus as in claim 3 wherein said apparatus comprises:
   means for receiving said emitted signals and interrupting power to
   said separate means for rotating said section in succession beginning with said section farthest from said entrance roller providing that rollers of each said section will stop rotating when covered by said respective items while waiting for said remaining sections to be occupied by said items.

5. An apparatus as in claim 3 wherein said detecting means is an electric eye.

6. An apparatus for conveying items from an entrance location to an exit location which comprises:
   a plurality of means for conveying said items between said locations;
   each of said conveying means including means for transporting each said item in a conveying direction from an upstream end to a downstream end, and horizontally arranged in a vertical column of said conveying means such that said upstream end and downstream end are respectively paired to said downstream end and said upstream end of a neighboring one of said conveying means;
   a top one of said conveying means having said upstream end adjacent to said entrance location and a bottom one of said conveying means having a downstream end adjacent to said exit location;
   a plurality of belt means, each belt means for forming a junction between one of said downstream ends and its paired upstream end respectively to carry each said item from said downside end to said respective upside end of neighboring conveyor means;

7. A conveying apparatus as in claim 6 wherein each said belt means comprises:
   a cylindrical support member coupled to said adjacent conveying means to revolve with a surface velocity equal to a surface velocity of said conveying means about a horizontal axis perpendicular to said conveying direction located at said respective downstream end;

at least one pair of continuous belts wherein each pair member has an outside surface adjacent to said other outside surface and said belts are mounted in operable combination with said cylindrical support member such that said outside surface of one of said belt pair members is in contact with and moves with a surface of said cylindrical support member;

means for adjustably forcing said outside belt surface towards said cylindrical support member surface providing that said item carried by said conveying means to said support member be sandwiched between said belt pair surfaces and thereby be carried to said upstream end of a next one of said conveying means.

8. A conveying apparatus as in claim 7 wherein said forcing means comprises a pneumatic cylinder.

9. A conveying apparatus as in claim 7 which comprises:

a rack means for supporting said continuous belt and said forcing means;

a track having one end adjacent to said cylindrical support member and a second end distal from said cylindrical support member;

a rack means for supporting said continuous belt and said forcing means rollably mounted on said track in operable arrangement to provide that, in one position of said rack, said at least one transfer belt and said cylindrical support member will carry said item from one downside end to an upside end of a neighboring conveying means and in another position is distal from said cylindrical support member providing access to said transfer belts and cylindrical support member by a user.

10. A conveying apparatus as in claim 6 wherein said apparatus comprises means for performing an operation on said items while being conveyed on each of said conveying means.

11. A conveying means as in claim 10 wherein said operation is selected from a group of operations consisting of hydrochilling, baking, drying and spraying.

12. A conveying apparatus as in claim 6 which comprises means for emitting a signal when one of said items is dislocated as it is being carried by said belt means.

13. A conveying apparatus as in claim 12 wherein said signal emitting means is an electric eye means located in operable combination with said belt means for emitting said signal.

14. A conveying means as in claim 12 wherein said detecting means is a position switch means located in operable combination with said belt means for emitting said signal.

* * * * *